United States Patent
Wright et al.

(10) Patent No.: US 6,289,986 B1
(45) Date of Patent: Sep. 18, 2001

(54) PUMP ROD DRIVE AND TORQUE RELEASE MECHANISM

(75) Inventors: Andrew J. Wright, Leduc; Michael Wawrzynowski, Edmonton, both of (CA)

(73) Assignee: Torque Control Systems Ltd. (CA)

(*) Notice: Subject to any disclaimer, the term of this patent is extended or adjusted under 35 U.S.C. 154(b) by 0 days.

(21) Appl. No.: 09/513,334

(22) Filed: Feb. 25, 2000

(51) Int. Cl.[7] .............................. E21B 43/00; F04B 47/04; F04B 49/00
(52) U.S. Cl. .................... 166/66.5; 166/68.5; 166/117.7; 166/237; 188/12 BA; 192/3.56; 192/3.57; 192/12 C; 192/18 A
(58) Field of Search ................................. 166/65.1, 66.5, 166/68.5, 72, 104, 117.7, 237; 188/12 B, 12 BA, 12 C; 192/354–357, 12 C, 12 R, 18 R, 18 A

(56) References Cited

U.S. PATENT DOCUMENTS 4,293,060 * 10/1981 Miller .
5,551,510 * 9/1996 Mills .
6,039,115 * 3/2000 Mills .
6,183,208 * 2/2001 Qandil et al. .

* cited by examiner

Primary Examiner—Roger Schoeppel
(74) Attorney, Agent, or Firm—Merek & Voorhees

(57) ABSTRACT

A pump rod drive and torque release mechanism for use in association with a downhole pump positioned within a well. The pump rod drive and torque release mechanism comprises a central housing having a generally hollow interior, a drive shaft received within the central housing, a drive rod received within the central housing, and a torque transfer mechanism positioned within the central housing. The drive shaft may be operatively connected to a pump rod rotator to impart rotational movement to the drive shaft. The drive rod may be operatively connected to a downhole pump so as to enable transference of rotational energy from the drive rod to the downhole pump. The torque transfer mechanism has an engaged position wherein it operatively connects the drive shaft to the drive rod such that rotation of the drive shaft causes rotation of the drive rod. The torque transfer mechanism also has a disengaged position wherein it operatively disconnects the drive shaft from the drive rod. When it is in its disengaged position, the torque transfer mechanism permits rotation of the drive rod relative to the drive shaft and a release of torque exerted on the drive rod by fluid present in the well above and bearing against the downhole pump.

31 Claims, 9 Drawing Sheets

PUMP ROD DRIVE AND TORQUE RELEASE MECHANISM

FIELD OF THE INVENTION

This invention relates to a pump rod drive mechanism, and in particular a pump rod drive and torque release mechanism for use in association with a downhole pump.

BACKGROUND OF THE INVENTION

When pumping oil (or for that matter water or other fluids) from wells of a significant depth, typically a downhole pump is utilized wherein the pump is physically located deep within the well to pump the oil or fluid to the surface. In many such applications the downhole pump of choice is a screw or progressive cavity pump. Screw or progressive cavity pumps generally operate through the revolution of a pump rotor within a stator. A rotating pump rod extends from the surface to the pump to drive the rotor. A power supply, which would most commonly be comprised of a gas or diesel engine or an electric motor, provides the means to rotate the pump rod. The pump rod is normally mechanically connected to the drive motor such that rotation of the drive motor causes direct rotation of the pump rod, and hence the pump rotor. A series of seals are used to engage the rod at the point where it exits the top of the well to prevent downhole fluids from leaking into the environment.

One of the more significant problems encountered with a screw or progressive cavity pumping operation is the back spin that can occur when the pump drive mechanism is shut down or fails. When the drive motor stops there will normally exist a very large amount of stored energy in the pump rod, similar to a wound coil spring. That is, during operation in a typical well the pump rod can be torqued to the extent that it physically winds up like a spring. When the drive motor shuts down that stored energy is released through back spin of the rod. There may also exist a large head of fluid within the well placing significant back pressure upon the pump rotor. The pressure of this head of fluid may contribute to the back spin of the pump rod as the fluid drains back into the well, particularly where the fluid is of a high specific gravity or where the well is relatively deep.

Through the release of torque stored in the pump rod and the draining of a significant head of fluid into the well, when the drive motor is shut down there can be experienced a back spin of the pump rotor at very high speeds, in some instances approaching a few thousand rpm. Since the pump drive system is often directly connected to the rotor, the entire drive system will be subjected to back spin. Uncontrolled back spin of this nature can severely damage the drive mechanism and other production equipment. In some instances the back spin can be so severe as to result in equipment destruction. Where such destruction occurs at the surface of the well there is the possibility of personal injury and environmental contamination.

In order to combat potential back spin in screw or progressive cavity pumping applications, others have developed a variety of different clamping or braking devices that can be used to physically grasp the pump rod when the drive mechanism has shut down. Unfortunately, the effectiveness of such braking mechanisms is limited as they prevent back spin by merely preventing rotation of the pump rod and in so doing result in the imposition of high levels of torque upon the drive, the rod and the pump. High levels of torque are undesirable as they may cause damage to the drive system and/or the pump. In addition, when pumping is ultimately resumed, the pump drive system must be started "under load" putting further strain on the drive motor and drive system.

SUMMARY OF THE INVENTION

The invention therefore provides a pump rod drive and torque release mechanism that serves to alleviate the problem of back spin through enabling built up torque to be safely dissipated when pumping ceases due to scheduled service or breakdown.

Accordingly, in one of its aspects the invention provides a pump rod drive and torque release mechanism for use in association with a downhole pump positioned within a well, the pump rod drive and torque release mechanism comprising a central housing having a generally hollow interior; a drive shaft received within said central housing, said drive shaft operatively connectable to a pump rod rotation means to impart rotational movement to said drive shaft; a drive rod received within said central housing, said drive rod operatively connectable to a downhole pump so as to enable transference of rotational energy from said drive rod to the downhole pump; and, torque transfer means positioned within said central housing, said torque transfer means having an engaged position wherein said torque transfer means operatively connects said drive shaft to said drive rod such that rotation of said drive shaft causes rotation of said drive rod, said torque transfer means having a disengaged position wherein said torque transfer means operatively disconnects said drive shaft from said drive rod, when in said disengaged position said torque transfer means permitting rotation of said drive rod relative to said drive shaft and a release of torque exerted on said drive rod.

In a further aspect the invention provides a pump rod drive and torque release mechanism for use in conjunction with a downhole pump, the pump rod drive and torque release mechanism comprising a central housing having a generally hollow interior; a drive shaft received within said central housing and operatively connectable to a pump rod rotation means to impart rotational movement to said drive shaft; a drive rod received within said central housing and operatively connectable to a downhole pump for transferring rotational energy from said drive rod to the downhole pump; and, torque transfer means positioned within said central housing and operatively located between said drive shaft and said drive rod, said torque transfer means including a first rotatable disc operatively connected to said drive shaft and a second rotatable disc operatively connected to said drive rod, said first and said second rotatable discs having opposed faces with force transferring members thereon, at least one of said first and said second rotatable discs longitudinally displaceable from a position wherein said force transferring members on said opposed faces of said discs are engaged, to a position wherein said force transferring members on said opposed faces are disengaged, such that when said force transferring members are engaged said first and said second rotatable discs are operatively connected thereby transferring rotational movement from said drive shaft to said drive rod, and when said force transferring members are disengaged said first and second rotatable discs are operatively disconnected permitting independent rotational movement of said drive shaft and said drive rod and the release of torque exerted on said drive rod.

In yet a further aspect the invention provides a pump rod drive and torque release mechanism for use in association with a downhole pump positioned within a well, the pump rod drive and torque release mechanism comprising a central housing having a generally hollow interior; a drive shaft received within said central housing, said drive shaft operatively connectable to a pump rod rotation means to impart rotational movement to said drive shaft; a drive rod received within said central housing, said drive rod operatively connectable to a downhole pump so as to enable transference of rotational energy from said drive rod to said downhole pump; a clutch positioned within said central housing such that when engaged said clutch operatively connects said drive shaft and said drive rod, when disengaged said clutch operatively disconnects said drive shaft and said drive rod permitting independent rotation of said drive rod relative to said drive shaft and a release of torque stored within said drive rod; and, a braking mechanism operatively connected to said drive rod, said braking mechanism at least partially controlling the rotation of said drive rod upon disengagement of said clutch. Further objects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

The present invention may be embodied in a number of different forms. However, the specification and drawings that follow describe and disclose only some of the specific forms of the invention and are not intended to limit the scope of the invention as defined in the claims that follow herein.

Figure 1:
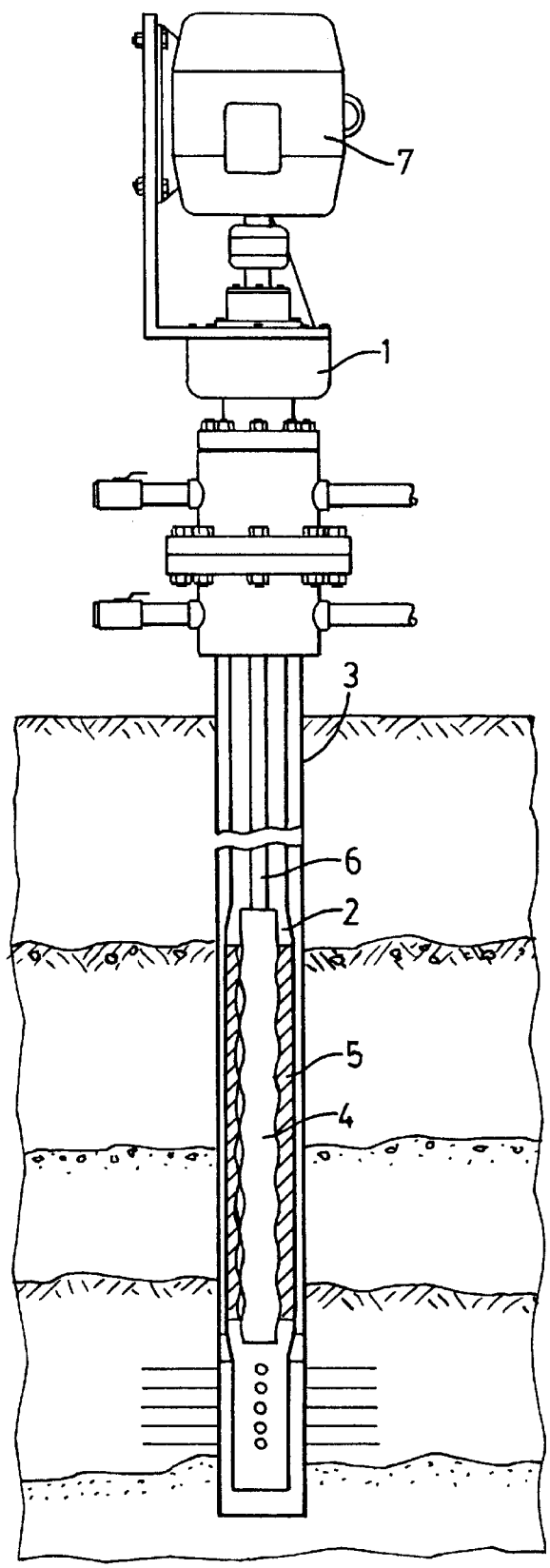
FIG. 1 is a side view of a preferred embodiment of the pump rod drive and torque release mechanism of the present invention.

In the attached Figures the pump rod drive and torque release mechanism of the present invention is noted generally by reference numeral 1. In FIG. 1, the invention is shown as it would typically be used in association with a downhole pump 2 positioned within a well 3. In this application, downhole pump 2 is a screw or progressive cavity pump having a rotor 4 and a stator 5. A sucker rod 6 is operatively connected to a pump rod rotation means 7 to transmit rotational energy from rotation means 7 to rotor 4 causing oil, water or other fluids within the well to be pumped upwardly to the surface. In FIG. 1 pump rod rotation means 7 is shown as comprising an electric motor, however, a wide variety of other drive mechanisms including gasoline, diesel and hydraulic motors could equally be used. In addition, depending upon the requirements of any particular installation and the equipment utilized, sucker rod 6 may be indirectly connected to rotation means 7 through the use of additional drive shafts, sheaves, belts, gears and speed reducers. The drive system can also be mounted either horizontally or vertically.

Figure 2:
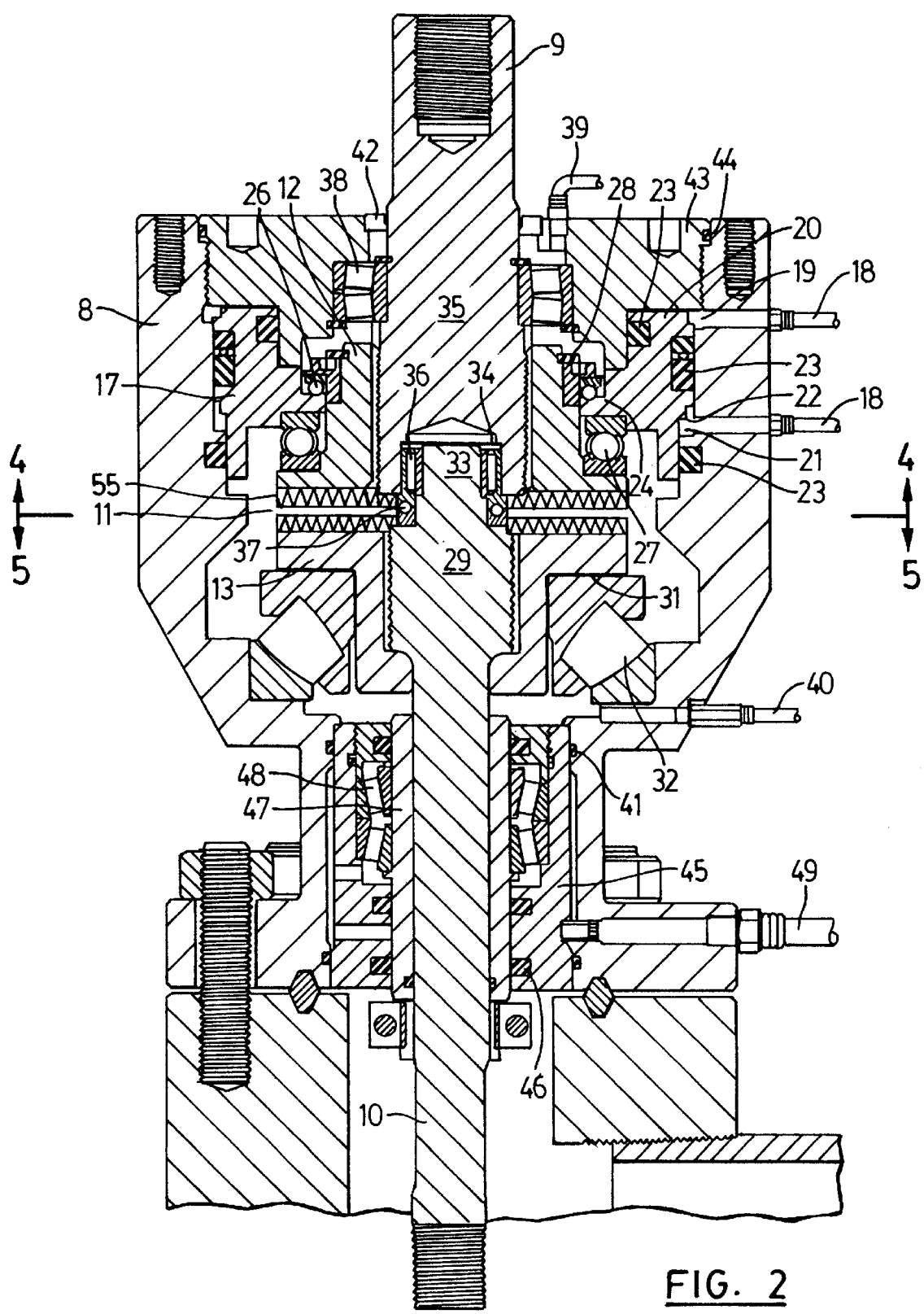
FIG. 2 is a side sectional view of the pump rod drive and torque release mechanism shown in FIG. 1 in its disengaged position.

Referring next to FIG. 2, the construction of pump rod drive and torque release mechanism 1 will now be described in more detail. Mechanism 1 is comprised generally of a central housing 8 having a generally hollow interior. To accommodate the assembly of the internal parts of mechanism 1, and to allow for servicing, a top cap 43 is preferably threadably received into the upper end of central housing 8. A drive shaft 9 is received within central housing 8 through its upper end and is operatively connectable to pump rod rotation means 7 such that the rotation means imparts rotational movement to the drive shaft. A drive rod 10 is received through the bottom portion of central housing 8 and within its hollow interior. The lower end of drive rod 10 is operatively connectable to downhole pump 2, through sucker rod 6, so as to enable the transference and rotational energy from the drive rod to the pump. It will once again be understood that intermediate drive shafts, rods, gears and other mechanical drive devices may be utilized where required. Regardless of any additional drive equipment, pump rod rotation means 7 will either directly or indirectly result in the rotation of drive shaft 9 and rotation of drive rod 10 will either directly or indirectly result in the transference of rotational energy to downhole pump 2.

So as to permit rotational energy to be transmitted from drive shaft 9 to drive rod 10, mechanism 1 further includes a torque transfer means positioned within central housing 8. In a preferred embodiment torque transfer means comprises a clutch (generally identified by reference numeral 11). Clutch 11 has an engaged position (see FIG. 3) where the clutch operatively connects drive shaft 9 to drive rod 10 such that rotation of the drive shaft causes rotation of the drive rod. Clutch 11 also has a disengaged position (see FIG. 2) wherein it operatively disconnects the drive shaft from the drive rod thereby permitting independent rotation of drive rod 10 relative to drive shaft 9. It will thus be appreciated that in its disengaged position, clutch 11 permits the independent rotation of drive rod 10, and hence rotor 4 of downhole pump 2, to allow for the release of torque that may be exerted upon the drive rod and the downhole pump by the force exerted on the pump rotor by a column of fluid in the well. That is, where pump rotation means 7 ceases to operate for purposes of scheduled maintenance, mechanical breakdown or other reason, the height of fluid in well 3 above downhole pump 2 will in most applications exert a significant hydraulic head upon rotor 4. Due to the construction of rotor 4 and stator 5, this hydraulic head will result in the exertion of torque upon both the rotor and its drive mechanism. Pursuant to the present invention, where pump rod rotation means 7 ceases to operate, clutch 11 effectively disengages the connection between drive shaft 9 and drive rod 10 thereby allowing drive rod 10 to effectively reverse direction so that the column of fluid built up in the well can drain through the bottom of the pump, and to release the torque that is stored in the pump and the drive system.

In one preferred embodiment of the present invention, clutch 11 includes a first rotatable disc 12 operatively connected to drive shaft 9 and a second rotatable disc 13 operatively connected to drive rod 10. First and second discs 12 and 13 have opposed faces, 14 and 15 respectively, having thereon engageable force transferring members 16. When clutch 11 is in its disengaged position force transferring members 16 on opposed faces 14 and 15 are operatively disconnected such that the discs are freely rotatable relative to one another. Further, when clutch 11 is in its engaged position, force transferring members 16 on opposed faces 14 and 15 are engaged to operatively connect first rotatable disc 12 to second rotatable disc 13 such that rotation of first disc 12 by drive shaft 9 causes rotation of second disc 13 and drive rod 10.

Clutch 11 further includes engagement means to place the clutch in its engaged position and disengagement means to place the clutch in its disengaged position. As described below, and as will be readily apparent to those skilled in the art, the engagement and disengagement means of clutch 11 may take a variety of different forms while remaining within the broad scope of the invention. In the preferred embodiment of the invention that is shown in FIGS. 2 through 6, the engagement and disengagement means comprises a hydraulically actuated piston 17. Piston 17 is received within the hollow interior of central housing 8 and is connected to a supply of pressurized hydraulic fluid through lines or piping 18. A confined upper chamber 19, adjacent to the upper end 20 of piston 17, together with a confined lower chamber 21, adjacent the lower end 22 of piston 17, can be pressurized with hydraulic fluid through lines 18 in order to cause the piston to move in an upward (retracted) or downward (extended) direction within central housing 8. A series of seals 23 prevent loss and leakage of hydraulic fluid from chambers 19 and 21.

Figure 3:
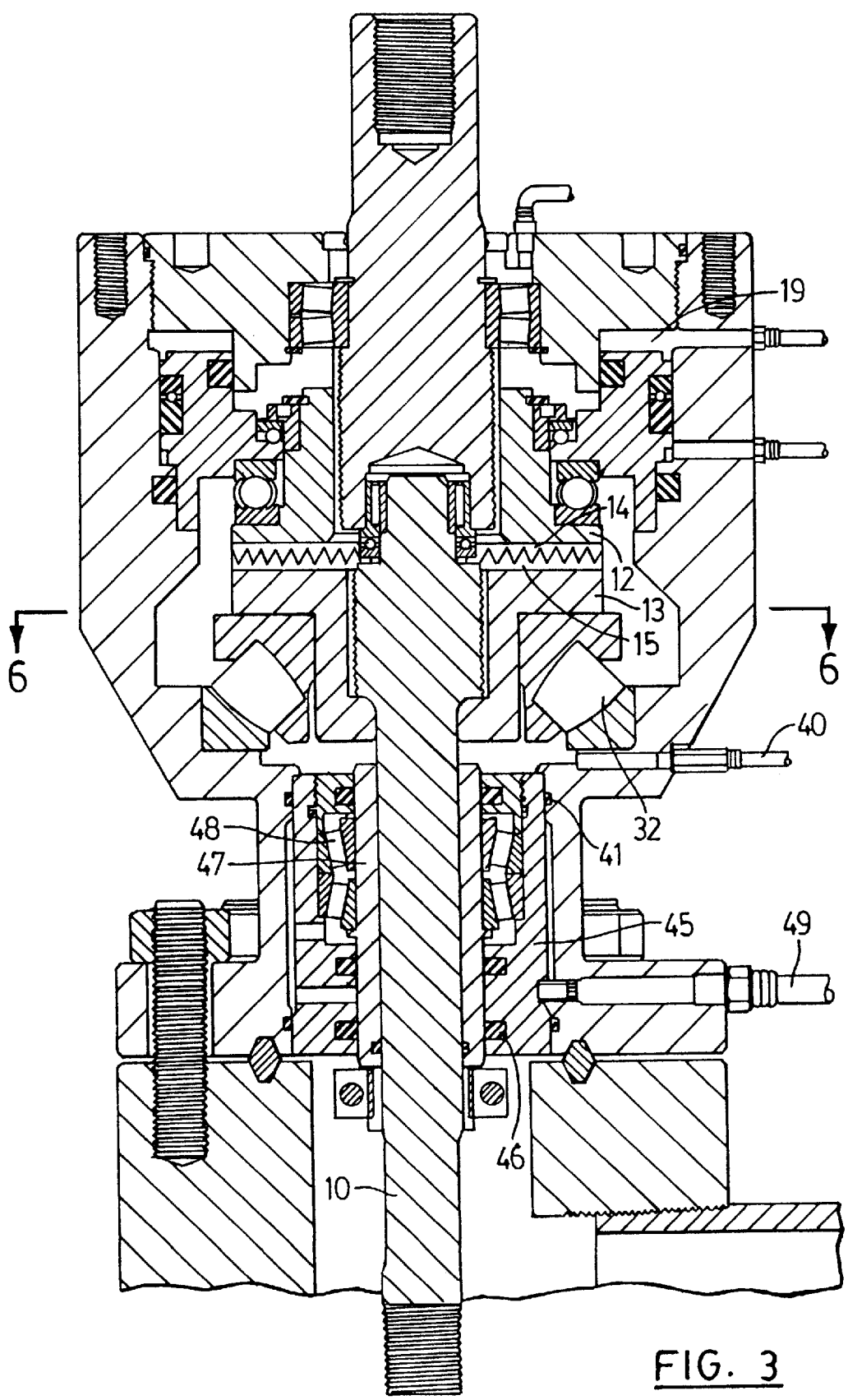
FIG. 3 is a side sectional view of the pump rod drive and torque release mechanism shown in FIG. 1 in its engaged position.
Figure 4:
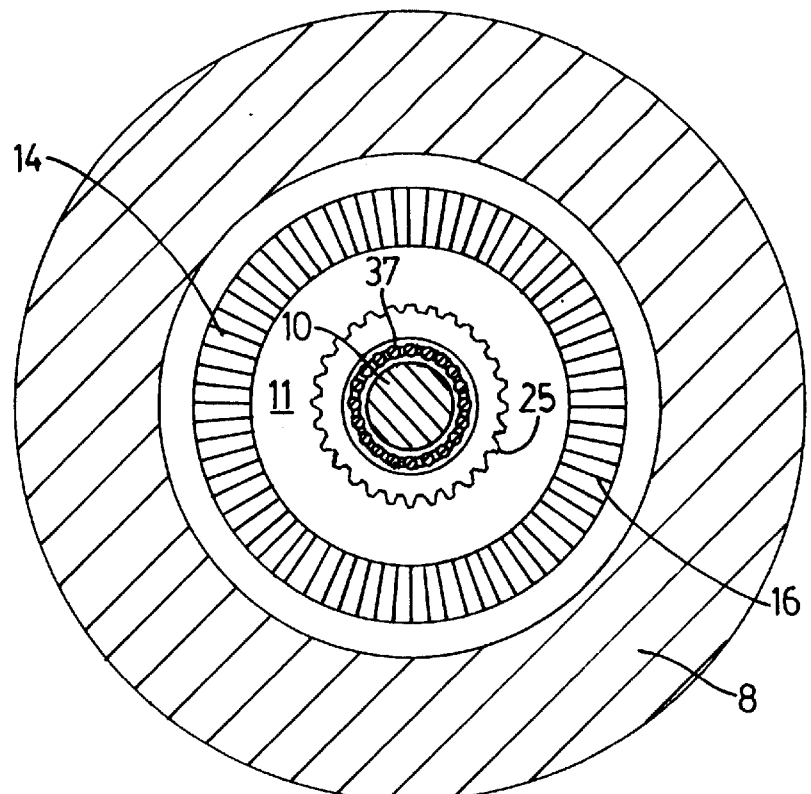
FIG. 4 is a sectional view taken along the line 4—4 of FIG. 2.
Figure 5:
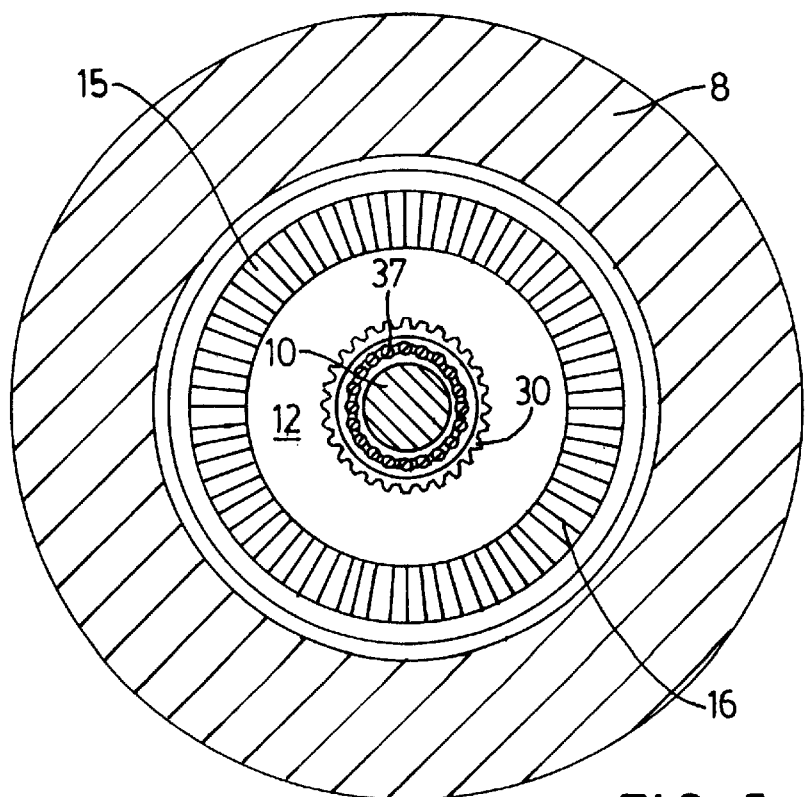
FIG. 5 is a sectional view taken along the line 5—5 of FIG. 2.
Figure 6:
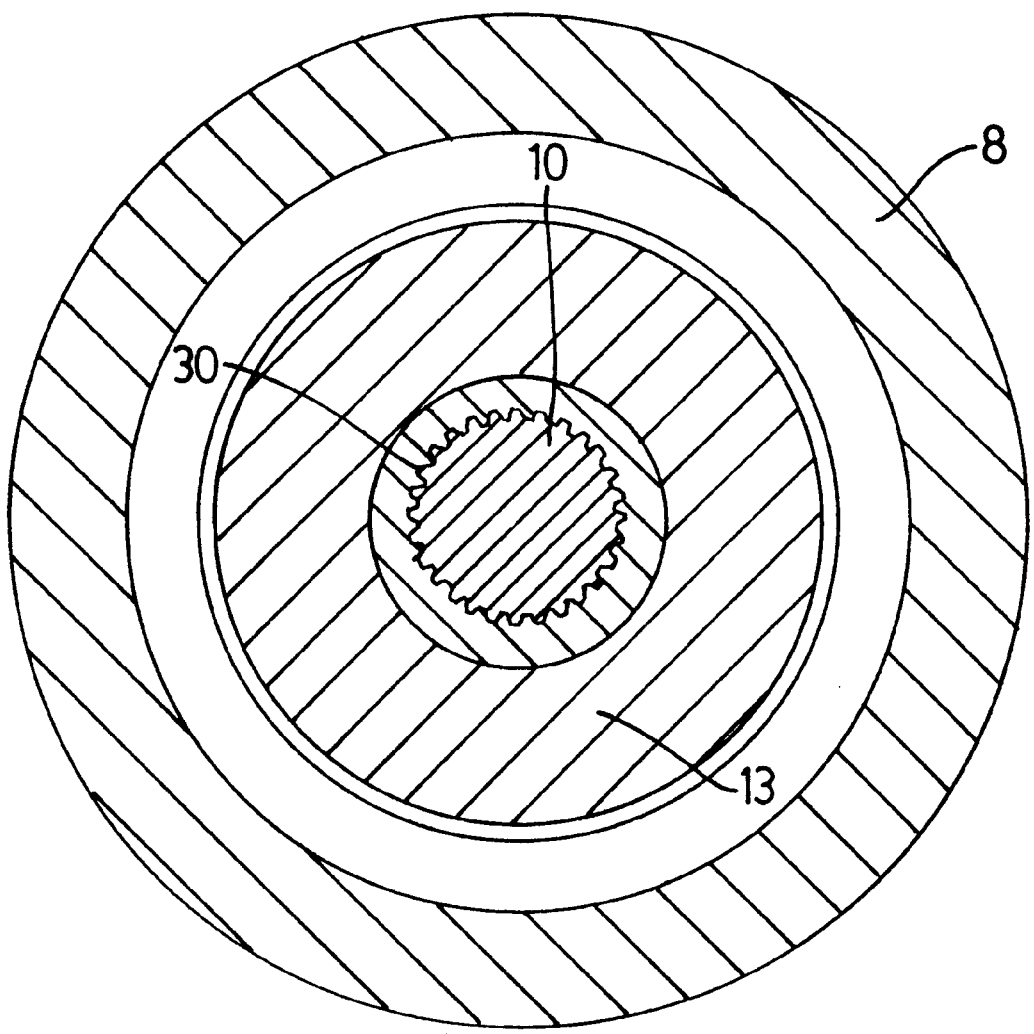
FIG. 6 is a sectional view taken along the line 6—6 of FIG. 3.

Through operation of hydraulic piston 17 between an extended position (see FIG. 3) and a retracted position (see FIG. 2) clutch 11 may be moved from its engaged to its disengaged position, and vice versa. In the embodiment of the invention as shown in FIGS. 2 and 3 this engagement and disengagement of clutch 11 is accomplished through the interaction of piston 17 and first rotatable disc 12. Through use of an inwardly directed flange 24, piston 17 is operatively connected to first rotatable disc 12. Further, first rotatable disc 12 is slidably received upon drive shaft 9 such that extension and retraction of piston 17 causes first rotatable disc 12 to move in a longitudinal or axial direction along drive shaft 9. Such longitudinal movement is preferably accomplished through the use of a splined connection between first rotatable disc 12 and drive shaft 9. It will be appreciated that corresponding axially oriented splines 25 will enable first rotatable disc 12 to slide along the end of drive shaft 9 while still enabling the transference of rotational movement from the drive shaft to the disc.

Accordingly, by means of the above described structure, movement of piston 17 will result in a corresponding axial movement of first rotatable disc 12 along the end of drive shaft 9. To accommodate for the rotational movement of first rotatable disc 12 within central housing 8, preferably a bearing 26 is positioned between first rotatable disc 12 and the upper surface of radial flange 24. Similarly, a bearing 27 is positioned between first rotatable disc 12 and the lower surface of radial flange 24. Bearings 26 and 27 may take a variety of different forms, however, since in the majority of applications the bearings will be subjected only to axial loading, they are preferably thrust bearings. An upper retainer clip 28 is received within first rotatable disc 12 so as to enable for the assembly of the piston/disc interface, and the insertion of bearings 26 and 27 therebetween.

Pursuant to the above described embodiment of pump rod and torque release mechanism 1, second rotatable disc 13 is secured to the upper end 29 of drive rod 10 in a manner that limits axial movement of the disc upon the drive rod. Through the limitation of axial movement of second rotatable disc 13, the extension of piston 17, and the resulting axial movement of first rotatable disc 12, will thus enable the engagement of force transferring members 16 upon opposed faces 14 and 15. That is, the structure enables opposed face 15 to remain stationery as opposed face 14 on first rotatable disc 12 is moved toward it through the extension of piston 17.

The securing of second rotatable disc 13 upon upper end 29 of drive rod 10 can be accomplished in a number of fashions. For example, second rotatable disc 13 could be integrally formed with the upper end of the drive rod. Alternatively, second rotatable disc 13 could be threaded or pinned to the drive rod. Thirdly, and as in the preferred embodiment shown in the attached Figures, second rotatable disc 13 is secured to end 29 of drive rod 10 by means of a series of corresponding longitudinally oriented splines 30 that allow for the transference of rotational energy and movement between the disc and the drive rod.

To limit axial movement of disc 13, and in particular downward axial movement, rotatable disc 13 is formed with an outwardly extending flange 31 that rests upon a bearing 32 received within central housing 8. Bearing 32 provides the dual function of serving as a means against which flange 31 can be supported to limit axial movement of disc 13 as well as providing a bearing to accommodate axial loading of second rotatable disc 13 and drive rod 10. Bearing 32 and flange 31 thereby help to allow for the engagement of force transferring members 16 upon engagement of clutch 11 by holding the second disc stable within the central housing. It will also be appreciated that in effect the weight of the drive rod, and to a large extent sucker rod 6 and pump motor 2, will be born by bearings 32. In the preferred embodiment, so as to account for side loading that may occur in non-vertical wells, bearings 32 are preferably tapered roller bearings.

Through an appreciation of the above described embodiment of the present invention it will be appreciated that engagement of clutch 11 is accomplished through pressurizing upper chamber 19 with hydraulic fluid to force piston 17 in a generally downward direction. As the piston moves downwardly its interaction with first rotatable disc 12 causes the disc to slide along the end of drive shaft 9 until force transferring members 16 on opposed faces 14 and 15 are engaged. At that point, rotational energy applied to drive shaft 9 will be transmitted to first rotatable disc 12, through force transferring members 16 to second rotatable disc 13, through second rotatable disc 13 to drive rod 10, and eventually to downhole pump 2. Frictional forces between piston 17, piston seals 23, and central housing 8 are sufficient to prevent rotational movement of the piston as first rotatable disc 12 revolves within the central housing. Bearings 26 and 27 accommodate axial loading between piston 17 and first rotatable disc 12 and facilitate independent rotation of the disc relative to the piston. Bearing 32 presents a face against which second rotatable disc 13 bears so as to allow for engagement of force transferring members 16. Bearing 32 also carries the axial load of the drive rod, pump rod and the rotatable discs. To disengage clutch 11, the pressure within upper chamber 19 is reduced and lower chamber 21 is pressurized to move piston 17 axially in an upward direction to its retracted position. As the piston moves upwardly it draws with it first rotatable disc 12 such that force transferring members 16 are disengaged. Bearing 26 accounts for axial loading of the piston during its upward movement and also allows for independent rotation of first rotatable disc 12 relative to the piston. Once force transferring members 16 on opposed faces 14 and 15 have been disengaged, second rotatable disc and drive rod 10 are free to rotate, in a reverse direction, relative to drive shaft 9.

In a preferred embodiment of the present invention upper end 29 of drive rod 10 includes a centrally located post 33 that is received within a centrally located bore 34 on the lower end 35 of drive shaft 9. Situated between post 33 and bore 34 is a set of radial bearings 36 and a set of thrust bearings 37. Radial bearings 36 accommodate rotational movement of the drive rod relative to the drive shaft whereas thrust bearings 37 accommodate axial loading that may exist between the drive rod and the drive shaft 9. The interaction of post 33, bore 34, and bearings 36 and 37 provide for the transmission of non-vertical loading from drive rod 10 through to drive shaft 9. For example, in applications on deviated wells, drive rod 10 will not be vertically oriented and will be subjected to non-axial loading. Through post 33, such non-axial loading is transferred, by way of bearings 36 and 37, to drive shaft 9, thereby presenting an inherently stronger and stiffer drive mechanism. To further account for such non-axial loading, and to accommodate the rotational movement of drive shaft 9 within central housing 8, mechanism 1 is provided with bearings means 38 between the upper end of drive shaft 9 and the central housing. Bearing means 38 may be comprised of roller bearings, or opposed tapered roller bearings that can accommodate both vertical and non-vertical loading.

The interaction between post 33 and bore 34 has a further application in the event of the disengagement of clutch 11 and back spin of drive rod 10 caused by the hydraulic head within the well. For deep wells, or wells pumping fluid of a high specific gravity, the head of fluid within the well can be sufficient to result in drive rod 10 being subjected to back spin of very high speeds (in some cases approaching several thousand rpm). When subjected to significant back spin, drive rod 10 and sucker rod 6 have a tendency to elongate and lift such that upper end 29 of the drive rod is pushed upwardly within central housing 8. The spline connection between drive rod 10 and second rotatable disc 13 permits some limited upward axial movement of the drive rod within the central housing. Thrust bearing 37 allows for the transference of axial loading of this nature from the drive rod to the drive shaft, while still permitting rotational movement of the drive rod relative to the drive shaft. In this manner it will be appreciated that pump rod drive and torque release mechanism 1 enables the back spin of the drive rod and the sucker rod to be accommodated safely and securely within the confines of central housing 8, and without the potential problems and difficulties presented by prior drive systems.

The smooth operation of the various internal moving components of mechanism 1 that are situated within central housing 8 is facilitated through the use of an external lubrication system. In a preferred embodiment of the invention central housing 8 is equipped with a lubrication input port 39 and output port 40. Through the use of ports 39 and 40 oil may be injected and circulated through central housing 8 in order to lubricate the various bearings and other components. To prevent the loss of oil from the interior of central housing 8 and contamination of the environment, a series of seals 41 are utilized at various points throughout the housing. For example, a lip seal 42 prevents the loss of fluid at the point where drive shaft 9 exits central housing 8. An o-ring seal 44 is used to prevent leakage of fluid from between top cap 43 and the housing.

During operation of pump rod drive and torque release mechanism 1, the contents of the well would typically be contained through the use of a variety of commonly used sealing mechanisms. One such sealing mechanism, and as shown in the attached Figures, comprises a seal cartridge 45 that contains a number of individual sealing elements 46, a wear sleeve 47, and internal bearings 48. Seal cartridge 45 may be hydraulically actuated by means of the application of hydraulic pressure through port 49. Seal cartridge 45 thus serves to contain the well contents and prevent their escape into housing 8 or into the environment.

It will also be appreciated by those skilled in the art that while in the above described embodiment of the invention first rotatable disc 12 is slidably received upon drive shaft 9 such that extension of the hydraulic piston causes axial movement of the first rotatable disc and engagement of the force transferring members, an exactly opposite structure could equally be employed while staying within the broad general scope of the invention. That is, second rotatable disc 13 could be constructed so as to be slidably received upon drive rod with piston 17 configured such that extension of the piston causes axial movement of second rotatable disc 13 and engagement of force transferring members 16 on opposed faces 14 and 15. Under such a structure the function and operation of mechanism 1 would be the same with the internal mechanisms essentially being a mirror image of those described above.

Figure 7:
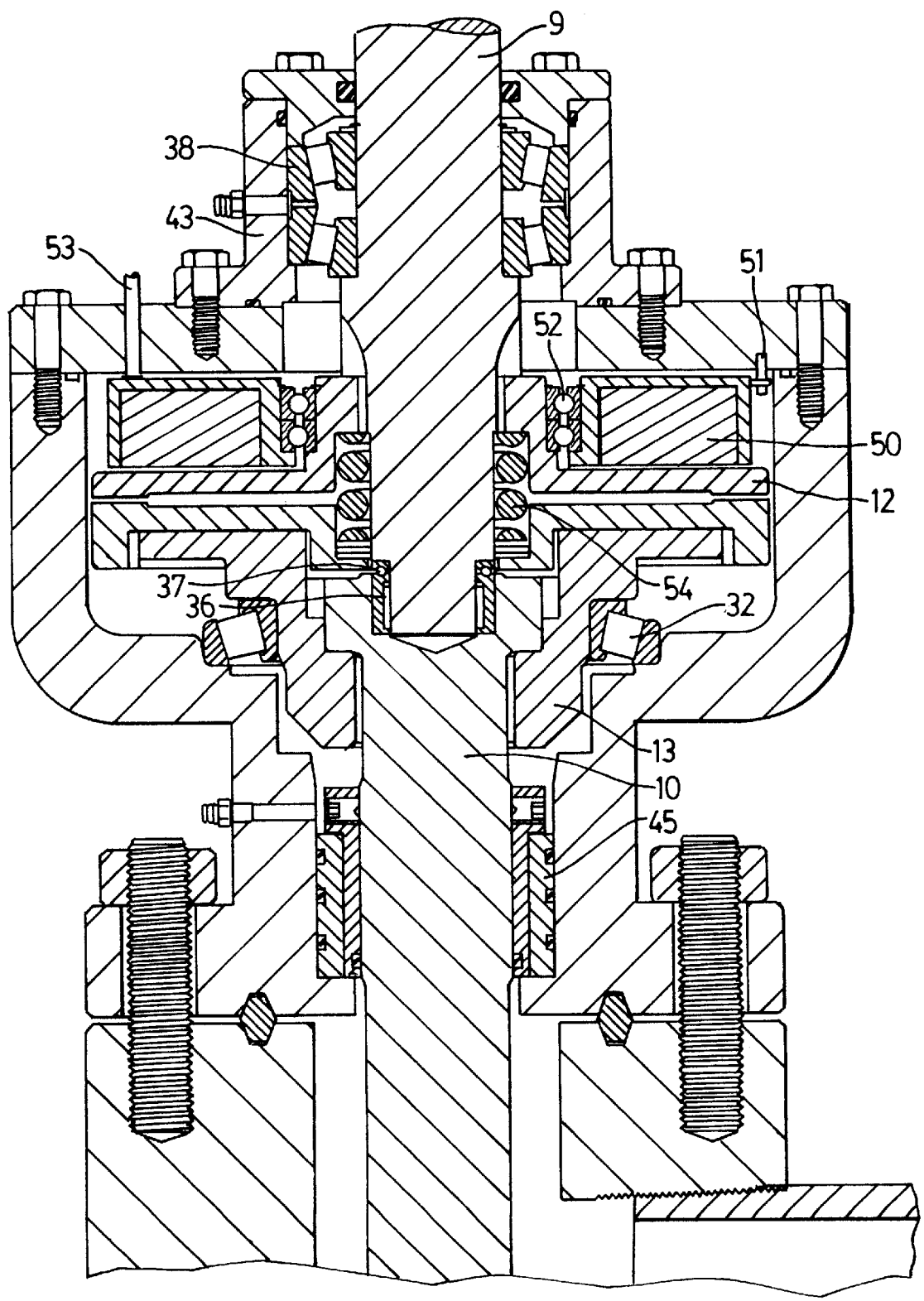
FIG. 7 is a side sectional view of an alternate embodiment of the pump rod drive and torque release mechanism of the present invention.
Figure 8:
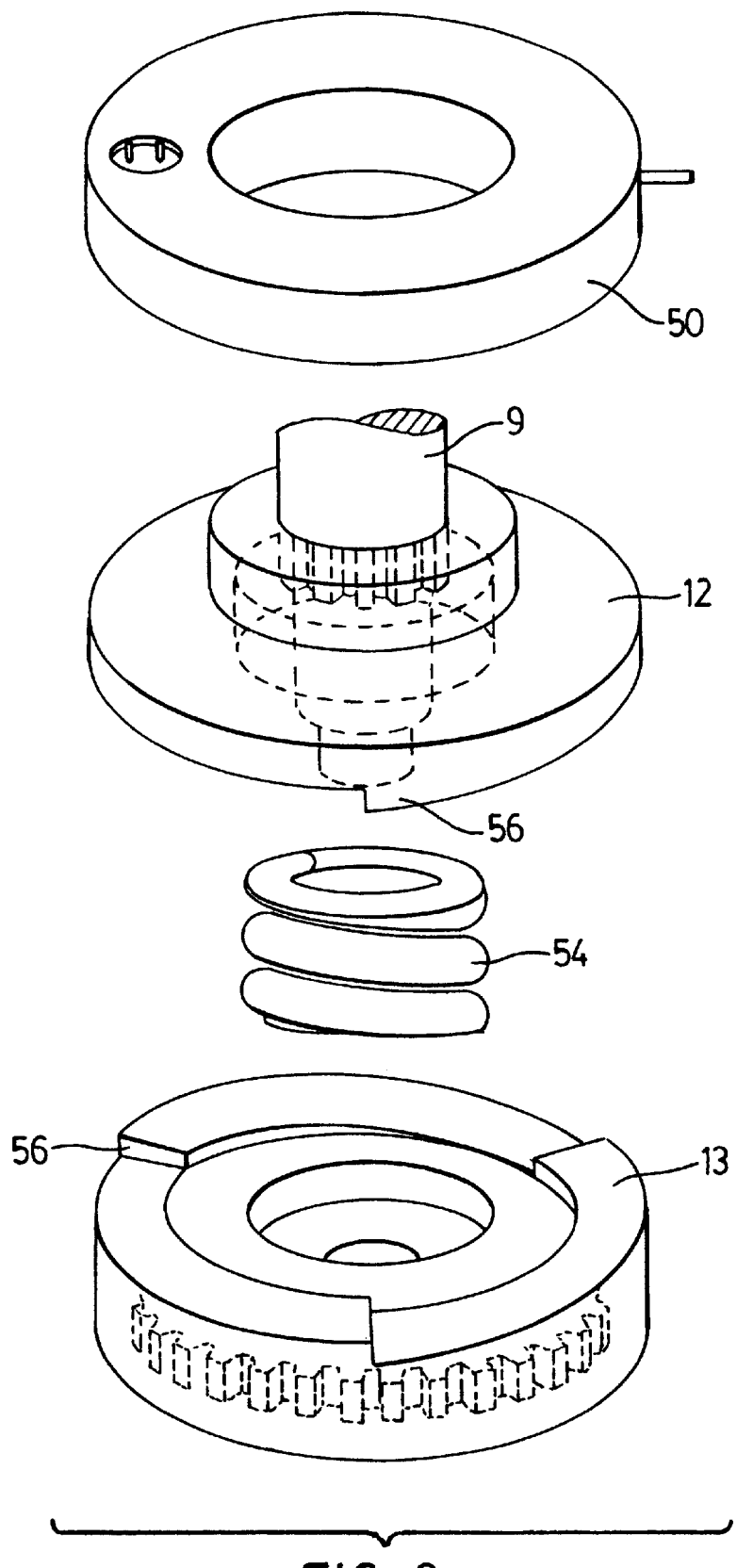
FIG. 8 is an exploded view of the internal clutch mechanism of the pump rod drive and torque release mechanism of FIG. 7.

A further alternate embodiment of the present invention is shown in FIGS. 7 and 8. In FIGS. 7 and 8 the engagement means for clutch 11 comprises an electromagnet 50. Electromagnet 50 is secured to top cap 43 of central housing 8 by means of a pin 51 that also serves the further function of preventing rotational movement of the magnet within the housing. Positioned between the interior surface of the magnet and first rotatable disc 12 is a set of bearings 52. A source of power is supplied to electromagnet 50 through electrical leads 53. Working in conjunction with electromagnet 50 is a disengagement means that comprises a spring 54. Spring 54 is placed circumferentially around the lower end of drive shaft 9 and between first and second rotatable discs 12 and 13.

In the embodiment of the invention shown in FIGS. 2 and 3 piston 17 can be actuated to cause very quick engagement and disengagement of clutch 11. For that reason, force transferring members 16 are preferably in the form of a series of outwardly extending teeth 55. However, in the embodiment shown in FIGS. 7 and 8 the engagement and disengagement of clutch 11 by electromagnet 50 and spring 54 is somewhat slower. As a result, force transferring members 16 on opposed faces 14 and 15 are preferably in the shape of ramped structures 55 (see FIG. 8). These ramp structures allow for a slower engagement and disengagement of clutch 11 while drive shaft 9 and drive rod 10 are rotating. The ramped structures also provide a positive transference of rotation in one direction only, and will effective slip over one another in situations of back spin.

In the embodiment shown in FIGS. 7 and 8, second rotatable disc is preferably slidably received upon drive rod 10 with first rotatable disc 12 in a fixed axial relationship. In this manner if second rotatable disc 13 is comprised of a ferrous material activation of electromagnet 50 will attract second rotatable disc 13 toward it causing axial movement of the disc and engagement of force transferring ramps 55. Deactivation of electromagnet 50 will eliminate the force drawing the second rotatable disc toward the first rotatable disc and allow spring 54 to disengage force transferring ramps 55, thereby permitting independent movement of drive rod 10 relative to drive shaft 9.

Once again, it will be appreciated that as in the case of the previously described embodiment while clutch 11 may be constructed so as to allow electromagnet 50 to act upon second rotatable disc 13, the internal structure of the clutch could essentially be reversed with first rotatable disc slidably received upon drive shaft 9, comprised of a ferrous material, and attracted to the second rotatable disc through activation of electromagnet 50.

In the embodiments of the present invention that utilize piston 17 or electromagnet 50 to engage clutch 11 there will also be provided a control system to control the engagement and disengagement of the clutch 11. Where hydraulic piston 17 is used to engage and disengage the clutch, there will be provided a hydraulic system to apply pressurized hydraulic fluid to the appropriate chamber 19 or 21 as is necessary to either engage or disengage the clutch. The hydraulic system could be one of any number of standard or commonly available hydraulic supply systems having a reservoir of hydraulic fluid and a pressurizing pump. Control of clutch 11 is then accomplished through the operation of the hydraulic pump and the opening and closing of electric solenoid valves to apply pressure to the appropriate chamber. Preferably both manual and automatic controls would be provided. The automatic controls would disengage the clutch in the event of an unexpected failure or breakdown of pump rod rotation means 7. In the embodiment where clutch 11 is engaged or disengaged through the use of electromagnet 50, an electrical control system would replace the described hydraulic system. The electrical control system would generally operate in a parallel fashion to the previously described hydraulic system but rather than supplying a source or pressurized hydraulic fluid to central housing 10, engagement and disengagement of clutch 11 would be accomplished through energizing or de-energizing electromagnet 50 by means of electrical leads 53.

Figure 9:
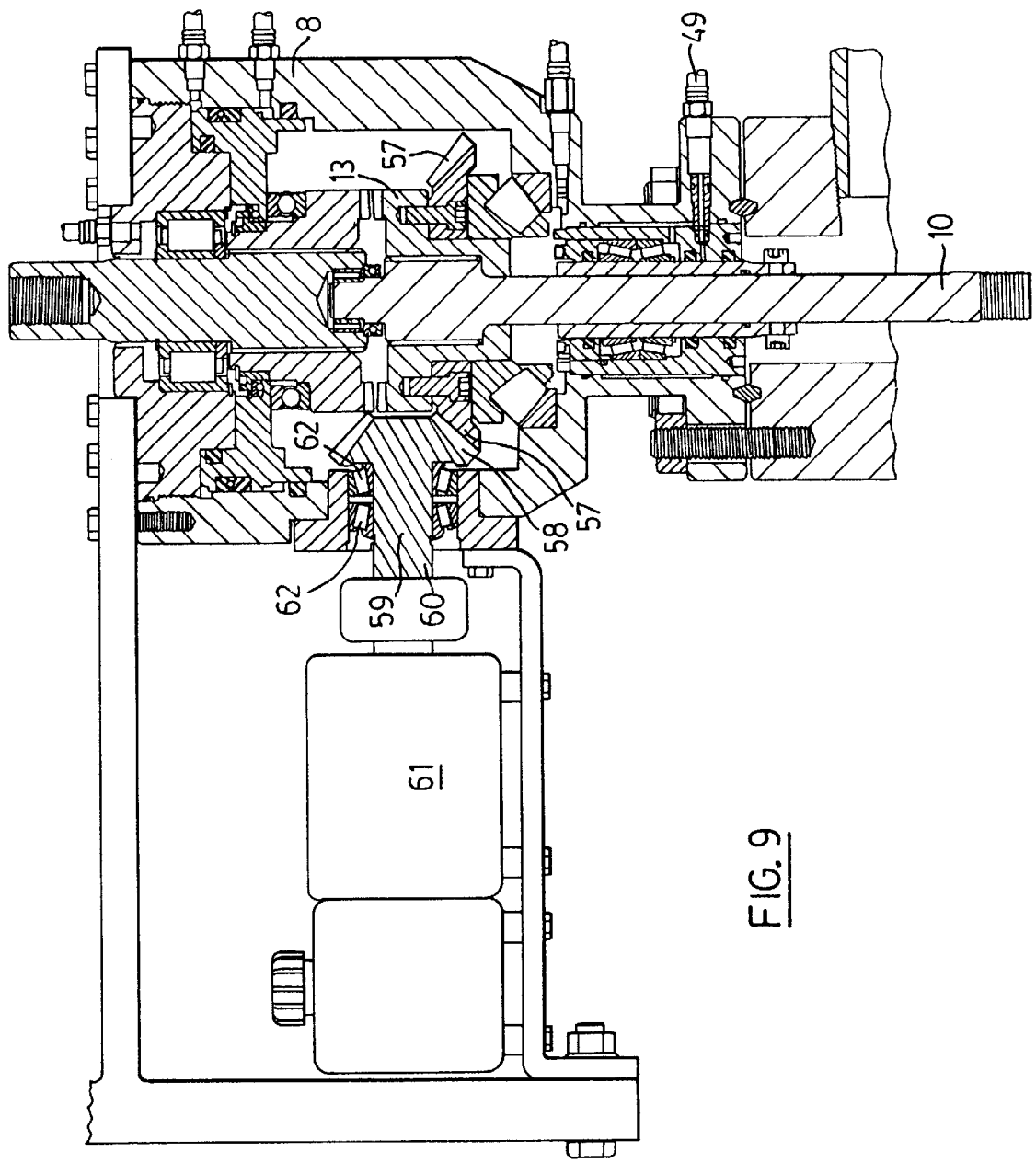
FIG. 9 is a side sectional view of an alternate embodiment of the pump rod drive and torque release mechanism of the present invention having an integrated braking mechanism; and, FIG. 10 is a side sectional view of a further alternate embodiment of the pump rod drive and torque release mechanism of the present invention having an alternate braking mechanism to that of FIG. 9.
Figure 10:
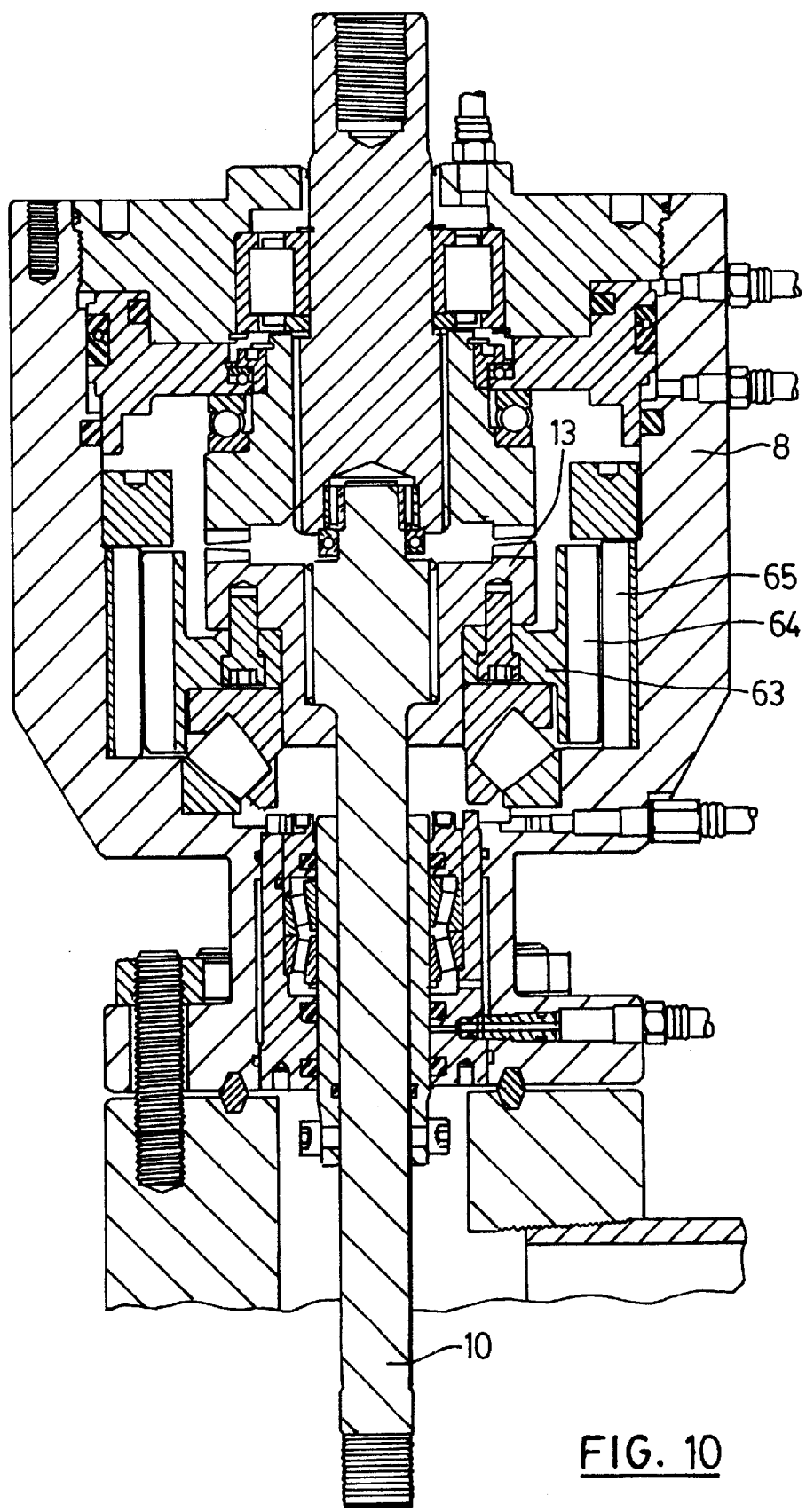

FIGS. 9 and 10 disclose yet a further embodiment of the present invention wherein there is included an integrated braking mechanism to assist in controlling the speed of the back spin of drive rod 10. Referring first to the embodiment shown in FIG. 9, there is provided a gear 57 attached to second rotatable disc 13 that meshes with a corresponding gear 58 on a shaft 59 extending through the side of central housing 8. The outer most end 60 of shaft 59 is connected to a hydraulic pump 61. Bearings 62 permit the free rotation of shaft 59 within housing 8.

During normal operation, the clockwise rotation of drive shaft 9 results in a corresponding clockwise rotation of drive rod 10, that in turn will result in a counterclockwise rotation of shaft 59. As shaft 59 rotates it will drive hydraulic pump 61, the output from which may be used to supply hydraulic fluid to port 39. Upon the disengagement of clutch 11, drive rod 10 will be free to reverse direction in order to dissipate torque stored within the drive rod. As the drive rod reverses and spins in a counterclockwise direction, gears 57 and 58 will cause both shaft 59 and pump 61 to rotate in a clockwise direction. The turning of hydraulic pump 61 in a reverse direction will create a build up of hydraulic pressure within the pump that will be slowly released through orifices in the pump's vanes. The resulting frictional drag within the pump will effectively result in the application of a braking force being applied through gears 57 and 58 to second rotatable disc 13. It will therefore be appreciated that the described structure will tend to at least partially control the rate of backspin of drive rod 10 upon the disengagement of clutch 11.

In the embodiment shown in FIG. 10 an alternate braking mechanism to that as described and shown in FIG. 9 is utilized. In FIG. 10 there is provided an outwardly extending ring 63 attached to second rotatable disc 13. On its outer most surface ring 63 contains a series of inclined vanes 64 that are slanted in a direction opposite to the primary direction of rotation of drive rod 10 during pumping operations. That is, since in a typical well the pump rod will rotated in a clockwise direction, vanes 64 will generally be oriented such that they are slanted in a counterclockwise direction. A series of correspondingly oriented vanes 65 are positioned upon the interior surface of housing 8 adjacent to vanes 64.

During normal pumping operations the internal cavity within housing 8 is filled with hydraulic fluid so as to provide an oil bath for the various bearings and other moving parts. When drive rod 10 is rotated in a clockwise direction, the counterclockwise orientation of vanes 64 and 65 will allow hydraulic fluid to be readily channeled out of the vanes with minimal resistance. Upon the disengagement of clutch 11 and the counterclockwise backspin of drive rod 10, the counterclockwise orientation of vanes 64 and 65 introduce an enhanced level of frictional force and an element of drag upon the drive rod through their interaction with hydraulic fluid within housing 8. In this manner vanes 64 and 65 operate as a form of dynamic braking system that helps to control and reduce the speed of the backspin of drive rod 10.

It is to be understood that what has been described are the preferred embodiments of the invention and that it may be possible to make variations to these embodiments while staying within the broad scope of the invention. Some of these variations have been discussed while others will be readily apparent to those skilled in the art. For example, while the invention has been described as including either a rotatable disc or a magnetic clutch, it will be appreciated that other forms of clutch mechanisms, including spiral gear drives, could equally be utilized.

What is claimed is:

1. A pump rod drive and torque release mechanism for use in association with a downhole pump positioned within a well, the pump rod drive and torque release mechanism comprising:

(i) a central housing having a generally hollow interior;

(ii) a drive shaft received within said central housing, said drive shaft operatively connectable to a pump rod rotation means to impart rotational movement to said drive shaft;

(iii) a drive rod received within said central housing, said drive rod operatively connectable to a downhole pump so as to enable transference of rotational energy from said drive rod to the downhole pump; and, (iv) torque transfer means positioned within said central housing, said torque transfer means having an engaged position wherein said torque transfer means operatively connects said drive shaft to said drive rod such that rotation of said drive shaft causes rotation of said drive rod, said torque transfer means having a disengaged position wherein said torque transfer means operatively disconnects said drive shaft from said drive rod, when in said disengaged position said torque transfer means permitting rotation of said drive rod relative to said drive shaft and a release of torque exerted on said drive rod.

2. The device as claimed in claim 1 wherein said torque transfer means comprises a clutch.

3. The device as claimed in claim 2 wherein said clutch further comprises a first rotatable disc and a second rotatable disc, said first and second rotatable discs having opposed faces with engageable force transferring members such that when said clutch is in said disengaged position said force transferring members are disengaged with said first and said second rotatable discs operatively disconnected and rotatable relative to one another, and when said clutch is in said engaged position said force transferring members are engaged to operatively connect said first and said second rotatable discs such that rotation of said first disc causes rotation of said second disc.

4. The device as claimed in claim 3 wherein said clutch includes engagement means to place said clutch in said engaged position with said force transferring members engaged.

5. The device as claimed in claim 4 wherein said clutch includes disengagement means to place said clutch in said disengaged position with said force transferring members disengaged.

6. The device as claimed in claim 5 including a braking mechanism to at least partially control the rotation of said drive rod when said clutch is disengaged.

7. The device as claimed in claim 6 wherein said engagement and said disengagement means comprises a hydraulically actuated piston, said piston having an extended and a retracted position such that when said piston is in said extended position said clutch is in said engaged position and when said piston is in said retracted position said clutch is in said disengaged position.

8. The device as claimed in claim 7 wherein said first rotatable disc is slidably received on said drive shaft such that extension of said hydraulically actuated piston causes slidable movement of said first rotatable disc and engagement of said force transferring members on said first and second discs, and retraction of said piston causes slidable movement of said first rotatable disc and disengagement of said force transferring members.

9. The device as claimed in claim 8 including bearing means to accommodate rotational and thrust loading of said drive shaft and said drive rod.

10. The device as claimed in claim 9 including sealing means to limit the ingress or egress of fluids and debris into and out of said central housing.

11. The device as claimed in claim 7 wherein said second rotatable disc is slidably received on said drive rod such that extension of said hydraulically actuated piston causes slidable movement of said second rotatable disc and engagement of said force transferring members on said first and second discs, and retraction of said piston causes slidable movement of said second rotatable disc and disengagement of said force transferring members.

12. The device as claimed in claim 11 including bearing means to accommodate rotational and thrust loading of said drive shaft and said drive rod.

13. The device as claimed in claim 12 including sealing means to limit the ingress or egress of fluids and debris into and out of said central housing.

14. The device as claimed in claim 6 wherein said engagement means comprises an electromagnet.

15. The device as claimed in claim 14 wherein said disengagement means comprises a spring.

16. The device as claimed in claim 15 wherein said second rotatable disc is slidably received on said drive rod such that activation of said electromagnet causes slidable movement of said second rotatable disc and engagement of said force transferring members on said first and second discs, and deactivation of said electromagnet causes said spring to slidably move said second rotatable disc to cause disengagement of said force transferring members.

17. The device as claimed in claim 16 including bearing means to accommodate rotational and thrust loading of said drive shaft and said drive rod.

18. The device as claimed in claim 17 including sealing means to limit the ingress or egress of fluids and debris into and out of said central housing.

19. The device as claimed in claim 15 wherein said first rotatable disc is slidably received on said drive shaft such that activation of said electromagnet causes slidable movement of said first rotatable disc and engagement of said force transferring members on said first and second discs, and deactivation of said electromagnet causes said spring to slidably move said first rotatable disc and disengage said force transferring members.

20. The device as claimed in claim 19 including bearing means to accommodate rotational and thrust loading of said drive shaft and said drive rod.

21. The device as claimed in claim 20 including sealing means to limit the ingress or egress of fluids and debris into and out of said central housing.

22. A pump rod drive and torque release mechanism for use in conjunction with a downhole pump, the pump rod drive and torque release mechanism comprising:

(i) a central housing having a generally hollow interior;

(ii) a drive shaft received within said central housing and operatively connectable to a pump rod rotation means to impart rotational movement to said drive shaft;

(iii) a drive rod received within said central housing and operatively connectable to a downhole pump for transferring rotational energy from said drive rod to the downhole pump; and, (iv) torque transfer means positioned within said central housing and operatively located between said drive shaft and said drive rod, said torque transfer means including a first rotatable disc operatively connected to said drive shaft and a second rotatable disc operatively connected to said drive rod, said first and said second rotatable discs having opposed faces with force transferring members thereon, at least one of said first and said second rotatable discs longitudinally displaceable from a position wherein said force transferring members on said opposed faces of said discs are engaged, to a position wherein said force transferring members on said opposed faces are disengaged, such that when said force transferring members are engaged said first and said second rotatable discs are operatively connected thereby transferring rotational movement from said drive shaft to said drive rod, and when said force transferring members are disengaged said first and second rotatable discs are operatively disconnected permitting independent rotational movement of said drive shaft and said drive rod and the release of torque exerted on said drive rod.

23. The device as claimed in claim 22 wherein said torque transfer means comprises a clutch.

24. The device as claimed in claim 23 including a braking mechanism to at least partially control the rotation of said drive rod when said clutch is disengaged.

25. The device as claimed in claim 24 wherein engagement and disengagement of said force transferring members occurs through axial movement of said second rotatable disc.

26. The device as claimed in claim 25 wherein said second rotatable disc is comprised of a ferrous material and said clutch includes an electromagnet that upon activation causes axial movement of said second rotatable disc and engagement of said force transferring members on said first and second rotatable discs.

27. The device as claimed in claim 25 including a hydraulically actuated piston having an extended and retracted position, movement of said piston between said extended and retracted positions causing axial movement of said second rotatable disc and engagement and disengagement of said force transferring members.

28. The device as claimed in claim 24 wherein engagement and disengagement of said force transferring members occurs through axial movement of said first rotatable disc.

29. The device as claimed in claim 28 wherein said first rotatable disc is comprised of a ferrous material and said clutch includes an electromagnet that upon activation causes axial movement of said first rotatable disc and engagement of said force transferring members on said first and second rotatable discs.

30. The device as claimed in claim 28 including a hydraulically actuated piston having an extended and a retracted position, movement of said piston between said extended and retracted positions causing axial movement of said first rotatable disc and engagement or disengagement of said force transferring members.

31. A pump rod drive and torque release mechanism for use in association with a downhole pump positioned within a well, the pump rod drive and torque release mechanism comprising:

(i) a central housing having a generally hollow interior;

(ii) a drive shaft received within said central housing, said drive shaft operatively connectable to a pump rod rotation means to impart rotational movement to said drive shaft;

(iii) a drive rod received within said central housing, said drive rod operatively connectable to a downhole pump so as to enable transference of rotational energy from said drive rod to said downhole pump;

(iv) a clutch positioned within said central housing such that when engaged said clutch operatively connects said drive shaft and said drive rod, when disengaged said clutch operatively disconnects said drive shaft and said drive rod permitting independent rotation of said drive rod relative to said drive shaft and a release of torque stored within said drive rod; and, (v) a braking mechanism operatively connected to said drive rod, said braking mechanism at least partially controlling the rotation of said drive rod upon disengagement of said clutch.

* * * * *